United States Patent [19]
Pajot

[11] Patent Number: 4,891,012
[45] Date of Patent: Jan. 2, 1990

[54] BUNCH OF ELECTRIC CONDUCTORS FOR MOTOR VEHICLES

[75] Inventor: Jean-Claude Pajot, Auvers sur Oise, France

[73] Assignees: Automobiles Peugeot, Paris; Automobiles Citroen, Neuilly/Seine, both of France

[21] Appl. No.: 170,256

[22] Filed: Mar. 18, 1988

[30] Foreign Application Priority Data

Mar. 18, 1987 [FR] France .................................. 87 03754

[51] Int. Cl.⁴ ...................... H01R 25/06; H01R 33/00
[52] U.S. Cl. ..................... 439/34; 174/72 A
[58] Field of Search ............ 439/34, 214, 215; 180/90; 174/110 F, 72 A

[56] References Cited

U.S. PATENT DOCUMENTS 3,582,533  6/1971  Albright et al. ............ 174/110 F X
4,423,282 12/1983  Suzuki et al. ............... 174/110 F X

FOREIGN PATENT DOCUMENTS 2164609  3/1986  United Kingdom ................. 439/34

*Primary Examiner*—Eugene F. Desmond
*Attorney, Agent, or Firm*—Burns, Doane, Swecker & Mathis

[57] ABSTRACT

The bunch of electric conductors comprises a plurality of sections (10a, 10b) which are interconnected and each group a plurality of conductor wires. At least one of the sections (10a, 10b) comprises a rigid body which contains the wires and has ends which are connected to mulitple connectors (11a, 13a, 15a, 13b, 15b) which are interconnected by the wires. With this arrangement, the bunch of conductors may be mounted in an automatized manner.

8 Claims, 2 Drawing Sheets

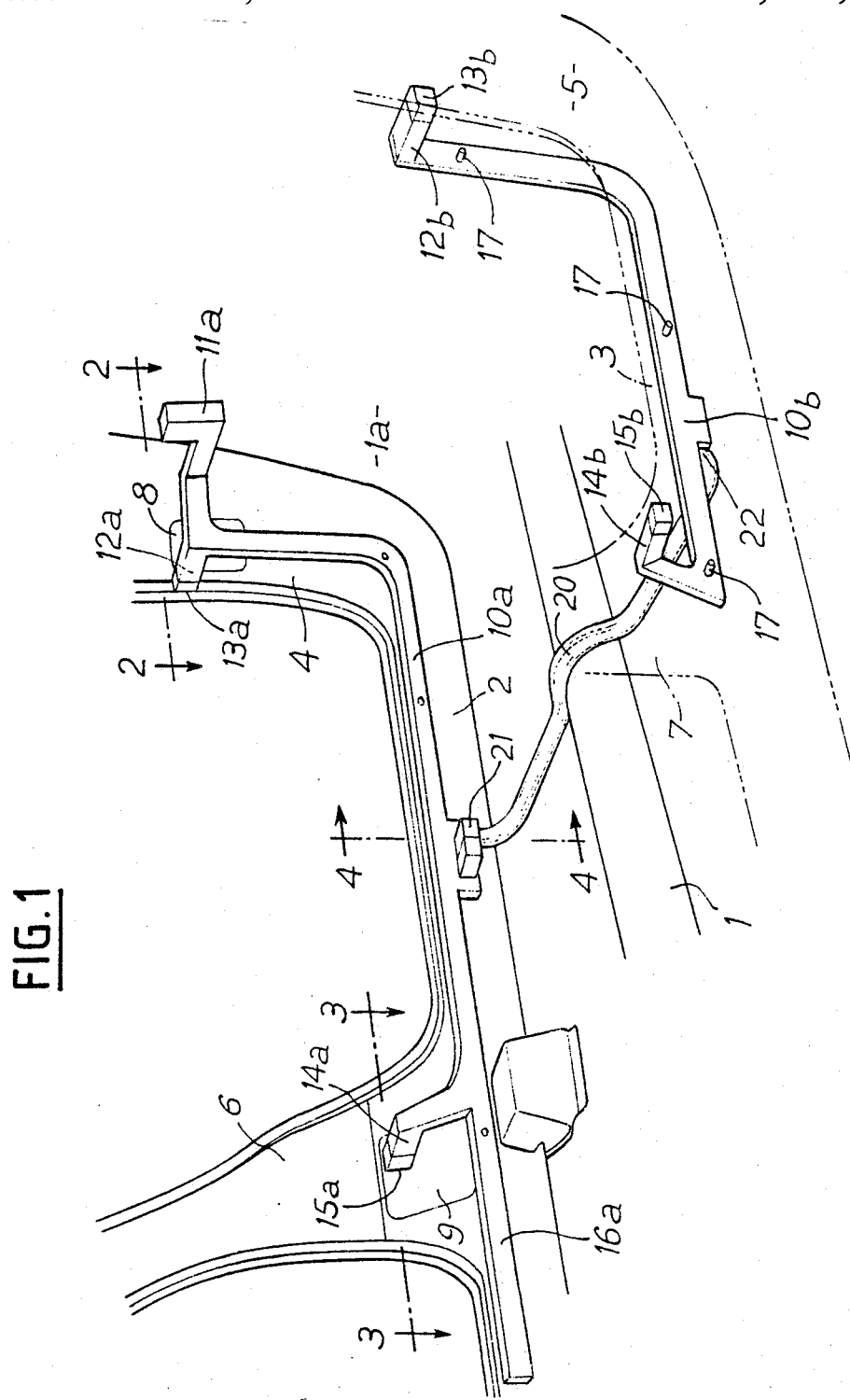

BUNCH OF ELECTRIC CONDUCTORS FOR MOTOR VEHICLES

The present invention relates to a bunch of electric conductors inside the passenger compartment of a motor vehicle.

In a motor vehicle, electric devices located in the compartment, such as control knobs or levers, electric window glasses, lighting means or fuses must be connected together or with other electric means located in the engine compartment of the vehicle. To achieve this connection, there are employed one or more bunches of flexible electric conductors arranged in a layer and forming an octopus the arms of which extend in different directions. Each of the ends of these arms is provided with one or more connectors. The electric bunch is fixed to the body of the vehicle and some elements of the bunch extend inside hollow bodies of the structure of the body, which usually requires a manual mounting. The ends of the bunch are then connected to the various electric elements or appliances.

This usual manner of mounting the electric conductor bunch of a motor vehicle presents various drawbacks which might result in a defective quality of the mounting and an excessively long time required for the mounting operation.

Indeed, this operation can only be carried out manually, since robots can only handle rigid or semi-rigid components. Now, an electric connecting bunch is usually flexible so that this operation cannot be automatized.

An object of the invention is to provide a bunch of electric conductors inside the passenger compartment of a motor vehicle which allows an automatic mounting.

The invention therefore provides a bunch of electric conductors for a motor vehicle, comprising a plurality of sections which are interconnected and each group a plurality of conductor wires, wherein at least one of the sections is constituted by a rigid body which contains the wires and whose ends are connected to multiple connectors connected by said wires.

According to other features;
the rigid body is made from an insulating plastics material such as hardened foam moulded onto the wires and onto the connectors;
the bunch comprises a rigid section which extends alonside a lateral edge of the floor of the vehicle and is fixed to the structure of the vehicle by elastically yieldable fasteners;
said rigid section comprises at least one transverse appendix which extends through a post of the structure of the vehicle and which is maintained therein by an elastically yieldable fastening of its end provided with a connector in particular for the electric supply of a vehicle door ;
said rigid section is connected by a flexible transverse section to a second rigid section extending alongside the other lateral edge of the floor of the vehicle.

A better understanding of the invention will be had from the following description which is given solely by way of example with reference to the accompanying drawings, in which :

FIG. 1 is a perspective view of a lower portion of the compartment of a vehicle, from which the front seat has been removed, and provided with a bunch of electric conductors according to the invention ;

Figure 3:
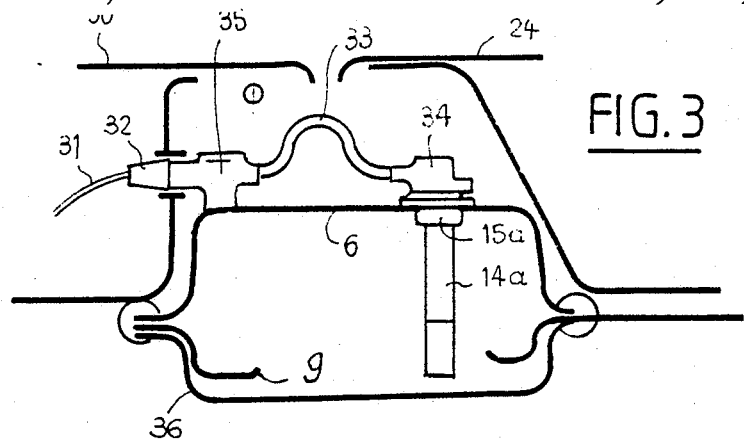
FIG. 3 is a sectional view taken on line 3—3 of FIG. 1 of a section of the bunch in the region of a rear door.

FIG. 1 shows a part of the structure of a motor vehicle comprising in particular a floor 1 whose front part 1a rises toward the dashboard (not shown). The structure of the vehicle also includes, on each side of the floor 1, a left side member 2, a right side member 3 and front feet or posts respectively 4 and 5 and middle feet or posts respectively 6 and 7 between which a front left door and a front right door (not shown in FIG. 1) are disposed.

The electric conductor bunch comprises a left section 10a and a right section 10b which extend alongside the lateral edges of the floor 1.

The left section 10a includes, adjacent to the front end of the vehicle a main multiple connector 11a to which the dashboard of the vehicle is connected and which distributes the current to the different points of the vehicle.

Further, the left section 10a is provided with a transverse appendix 12a extending through the front post 4 through an opening 8 and including at its end a connector 13 a in particular for the electric supply of the front left door.

The left section 10a also comprises, for the electric supply of the rear left door, a transverse appendix 14a provided with a connector 15a and extending through the middle post 6 through an opening 9 in the latter.

The appendices 12a and 14a are maintained in the posts 4 and 6 of the structure of the vehicle, for example by the elastically yieldable fastening of their ends.

Likewise, the right section 10b is provided with two transverse appendices 12b and 14b each having at its end a respective connector 13b and 15b for supplying current to the front right door and the rear right door. These appendices are also maintained in the posts 5 and 7 of the structure of the vehicle for example by elastically yieldable fastening means.

Furthermore, the left section 10a includes adjacent to the rear of the vehicle an extension 16a provided with a multiple connector (not shown) at its end for the supply of current to the rear of the vehicle.

The sections 10a and 10b of the electric conductor bunch are constituted by a rigid body containing the wires and made from an insulating plastics material, such as a hardened foam moulded onto the wires and onto the connectors interconnected by said wires.

The sections 10a and 10b are respectively fixed to the left side member 2 and to the right side member 3, for example by elastically yieldable fasteners by means of small pins 17 which extend from a side of the body of said sections and are in one piece with this body.

Figure 4:
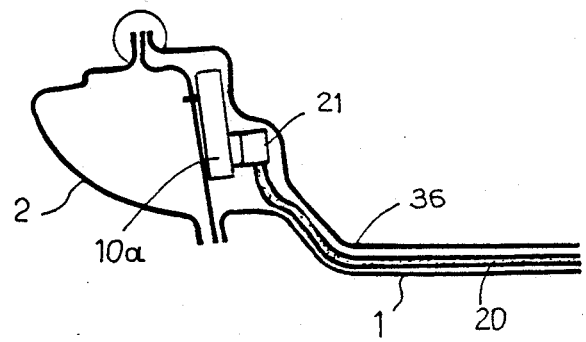
FIG. 4 is a sectional view taken on line 4—4 of FIG. 1.

As can be seen in FIGS. 1 and 4, the rigid sections 10a and 10b are interconnected by a transverse section 20 constituted for example by a flexible layer which bears against the floor 1 and is provided with end connectors 21 and 22 connecting it to the two rigid sections 10a and 10b.

Figure 2:
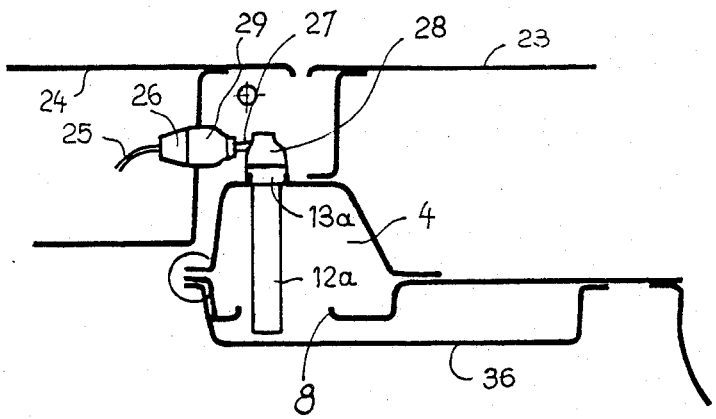
FIG. 2 is a sectional view taken on line 2—2 of FIG. 1 of a section of the electric bunch in the region of a front door.

With reference now to FIGS. 2 and 3, there will now be described the electric connections between the rigid section 10a and the front left door and rear left door of the vehicle, the connections between the rigid section 10b and the front right and rear right doors being effected in the same way.

FIG. 2 represents diagrammatically the front left wing 23, the front left door 24 and the front post 4 into which extends the appendix 12a of the section 10a provided with the connector 13a. The door 24 includes components which must be supplied with current, which are not shown in the drawings but which are connected to an end bunch of conductors 25 itself provided with an end connector 26. The connection between the appendix 12a of the rigid section 10a and the end bunch 25 is achieved by a flexible intermediate bunch 27 which terminates at its two ends in connectors 28 and 29 which are complementary to the connectors 13a and 26.

Likewise, the rear left door 30 includes components supplied with current and connected to an end bunch 31 of conductors provided with an end connector 32. The connection between the appendix 14a of the rigid section 10a and the end bunch 31 is achieved by a flexible intermediate bunch 33 which terminates at both ends in connectors 34 and 35 which are complementary to the connectors 15a and 32.

The rigid sections 10a and 10b and the flexible section 20 are covered with a trim 36 or may be connected to the trim element of the compartment of the vehicle and even integral with this trim element.

The rigid sections 10a and 10b may also include other multiple connectors for supplying current to other components of the vehicle.

The advantages of this electric conductor bunch according to the invention are clear from the foregoiong description. As the conductor bunch is formed by rigid sections fixed to the structure of the vehicle by simple and reliable means, it permits an entirely automatic mounting thereof.

There is consequently an appreciable saving in time when mounting the bunch of conductors in a production line.

I claim:

1. A bunch of electric conductors for a motor vehicle comprising a plurality of interconnected sections, each section grouping a plurality of conductor wires, at least one of the sections comprising a rigid body which contains the wires and has ends, and multiple connectors connected to said ends and interconnected by said wires, the rigid body being made from an insulating plastics material moulded onto the wires and onto the connectors.

2. A bunch according to claim 1, in combination with a vehicle which comprises a compartment provided with trims, wherein at least one rigid section of the bunch is connected to a trim of the compartment of the vehicle.

3. A bunch according to claim 1, wherein said plastics material is a hardened foam material.

4. A bunch according to claim 1, in combination with a vehicle comprising a body structure defining a floor having opposed lateral edges, said bunch comprising at least one rigid section which extends alongside a lateral edge of the floor of the vehicle, elastically yieldable fasteners fixing said rigid section to the structure of the vehicle.

5. A bunch according to claim 4, wherein the structure of the vehicle comprises a post and said rigid section comprises at least one transverse appendix which extends through said post and terminates in an end provided with a connector, said end of said appendix being maintained in said post by an elastically yieldable fastening thereof.

6. A bunch according to claim 5, wherein said connector of said appendix serves to supply electric current to a door of the vehicle.

7. A bunch according to claim 5, comprising a flexible transverse section, a second rigid section extending alongside an opposite lateral edge of the floor relative to the first-mentioned lateral edge, the first-mentioned rigid section being connected through said flexible transverse section to said second rigid section.

8. A bunch according to claim 7, wherein the flexible section bears on the floor of the vehicle and is provided with end connectors connecting the flexible section to the two rigid sections.

* * * * *